United States Patent
Tang et al.

(10) Patent No.: US 8,714,892 B2
(45) Date of Patent: May 6, 2014

(54) SPINDLE HEAD STRUCTURE ROTATABLE IN A/B AXES

(75) Inventors: Xiaoqiang Tang, Haidian District Beijing (CN); Liping Wang, Haidian District Beijing (CN); Zhufeng Shao, Haidian District Beijing (CN); Dianjun Wang, Haidian District Beijing (CN); Rui Yao, Haidian District Beijing (CN); Lin Qu, Haidian District Beijing (CN)

(73) Assignee: Tsinghua University, Beijing (CN)

( * ) Notice: Subject to any disclaimer, the term of this patent is extended or adjusted under 35 U.S.C. 154(b) by 887 days.

(21) Appl. No.: 12/896,333

(22) Filed: Oct. 1, 2010

(65) Prior Publication Data

US 2012/0082526 A1  Apr. 5, 2012

(51) Int. Cl.
*B23C 1/12* (2006.01)
*B23Q 1/54* (2006.01)
*B25J 17/00* (2006.01)
*B25J 9/00* (2006.01)
*B25J 17/02* (2006.01)

(52) U.S. Cl.
CPC ............... *B23C 1/12* (2013.01); *B23Q 1/5406* (2013.01); *B25J 17/025* (2013.01)
USPC ........ 409/216; 409/201; 409/235; 74/490.01; 74/490.07; 74/490.05

(58) Field of Classification Search
CPC ...... B23C 1/12; B23Q 1/5406; B23Q 1/5412; B23Q 1/5418; B23Q 1/5425; B23Q 1/5437; B23Q 1/5462; B23Q 2220/006; B25J 17/0241; B25J 17/025; B25J 17/0266
USPC .................. 409/201, 211, 216, 235; 408/234; 74/490.01, 490.03, 490.05, 490.07, 74/490.1
See application file for complete search history.

(56) References Cited

U.S. PATENT DOCUMENTS

| | | | | |
|---|---|---|---|---|
| 5,941,128 A | * | 8/1999 | Toyama et al. | 409/211 |
| 5,987,726 A | * | 11/1999 | Akeel | 29/407.08 |
| 6,402,444 B1 | * | 6/2002 | Wang et al. | 409/235 |
| 6,477,912 B2 | * | 11/2002 | Song et al. | 74/490.06 |
| 6,575,676 B2 | * | 6/2003 | Wang et al. | 409/201 |
| 7,040,033 B2 | * | 5/2006 | Zhu et al. | 33/502 |
| 7,261,502 B2 | * | 8/2007 | Pasquetto | 409/201 |
| 2007/0248428 A1 | * | 10/2007 | Ota | 409/201 |
| 2008/0078075 A1 | * | 4/2008 | Schrott | 29/40 |

FOREIGN PATENT DOCUMENTS

JP         02-024031 A  *  1/1990

* cited by examiner

*Primary Examiner* — Erica E Cadugan
(74) *Attorney, Agent, or Firm* — Morgan, Lewis & Bockius LLP

(57) ABSTRACT

A spindle head structure rotatable in A/B axes is provided, comprising: a spindle support, an intermediate support, a base support, an upper telescopic strut and a lower telescopic strut. The spindle support may be adapted to be fixed with a spindle. The intermediate support may be connected with the spindle support via two coaxial upper revolute pairs. The base support may be connected with the intermediate support via two coaxial lower revolute pairs. The upper telescopic strut may be connected between the spindle support and the intermediate support. And the lower telescopic strut may be connected between the intermediate support and the base support.

4 Claims, 1 Drawing Sheet

SPINDLE HEAD STRUCTURE ROTATABLE IN A/B AXES

BACKGROUND

1. Field of the Invention

The present disclosure relates generally to machinery manufacturing, more specifically, to an improved spindle head structure rotatable in A/B axes.

2. Description of the Related Art

Commonly, a coordinate axis rotating around X-axis, Y-axis and Z-axis of a machine tool are described as A-axis, B-axis and C-axis respectively. Generally, a spindle head which may rotate around both the X-axis and Y-axis may be described as a spindle head rotatable in A/B axes or an A/B swing head, and a spindle head which may rotate around both the X-axis and the Z-axis may be described as a spindle head rotatable in A/C axes or an A/C swing head.

Conventionally, most machining centers are equipped with two-rotation-axis spindle heads, such as spindle heads rotatable in A/C axes.

However, the spindle head rotatable in A/B axes has a rotational range smaller than that of the spindle head rotatable in A/C axes whereas the manufacturing efficiency thereof is higher with decreased distortion during the manufacture. Particularly, the spindle head rotatable in A/B axes has advantages during manufacture of components which need lots of cutting, such as some complicated components in a thin-walled aircraft. Recently, the Spindle head rotatable in A/B axes becomes a key component in machining area. For instance, a Z3 spindle head commercially available from DS Technologie Company, Germany is developed on the parallel mechanism, and achieves great commercial success. The Z3 spindle head has three degrees of freedom including two rotational degrees of freedom along A and B axes and a translational degree of freedom along Z-axis.

However, when used in a machining center, it normally meets practical use when the spindle head may have rotational degrees of freedom in A and B axes. Therefore, to machine with high-speed and high-precision etc, it is necessary to develop a novel decoupled spindle head which is rotatable in A/B axes.

There are many shortcomings of the conventional dual-axis-rotatable spindle head, such as a complex structure, poor accuracy, a low stiffness, and high cost.

SUMMARY

The present disclosure is directed to solve at least one of the problems existing in the prior art. Accordingly, a spindle head structure rotatable in A/B axes is provided.

According to an aspect of the present disclosure, a spindle head structure rotatable in A/B axes may be provided, which may comprise a spindle support adapted to be fixed with a spindle, an intermediate support connected with the spindle support via two coaxial upper revolute pairs, a base support connected with the intermediate support via two coaxial lower revolute pairs, an upper telescopic strut connected between the spindle support and the intermediate support, and a lower telescopic strut connected between the intermediate support and the base support.

According to an embodiment of the present disclosure, the upper telescopic strut may comprise an upper telescopic limb, a first revolute pair connected between the upper telescopic limb and the spindle support, and a second revolute pair connected between the upper telescopic limb and the intermediate support. The lower telescopic strut may comprise a lower telescopic limb, a third revolute pair connected between the lower telescopic limb and the base support, and a forth revolute pair connected between the lower telescopic limb and the intermediate support.

According to an embodiment of the present disclosure, the coaxial upper revolute pairs may have axes substantially perpendicular to those of the coaxial lower revolute pairs.

According to an embodiment of the present disclosure, the intermediate support may be driven by the lower telescopic strut to rotate around the lower revolute pairs relative to the base support, and the spindle support may be driven by the upper telescopic strut to rotate around the upper revolute pairs relative to the intermediate support, so that the spindle support is rotatable around X and Y axes relative to the base support.

According to the present disclosure, the spindle support may have two separated rotational degrees of freedom, each of which may realize a rotational degree of freedom of the spindle support respectively. The rotational range of the spindle support may have a swing angle with a range of ±45 degrees in general and ±60 degrees in maximum, which may sufficiently meet working demand with larger torque, higher machining accuracy and efficiency. And the A-axis and the B-axis are decoupled from each other. Further, the spindle head structure rotatable in A/B axes may have a simplified structure and adapted to be cooperated with other devices in combined machining with high speed and high accuracy, which may have a wide range of applicability in industries.

Additional aspects and advantages of the embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of the invention will become apparent and more readily appreciated from the following descriptions taken in conjunction with the drawings in which.

DETAILED DESCRIPTION OF THE EMBODIMENTS

Figure 1:
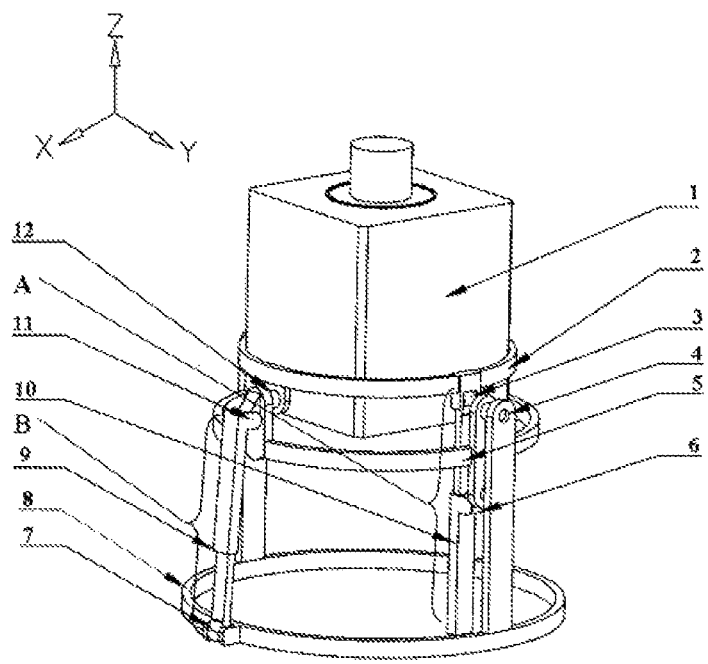
FIG. 1 is a schematic view of a spindle head structure rotatable in A/B axes according to a first embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the description, relative terms such as "lower", "upper", "horizontal", "vertical", "above", "below", "up", "top", "bottom" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation. Terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

According to some embodiments of the present disclosure, a spindle head structure rotatable in A/B axes will be described in detail with reference to the accompanying drawings. And FIG. 1 is a schematic view of a spindle head structure rotatable in A/B axes according to a first embodiment of the present disclosure; and FIG. 2 is a schematic view of a spindle head structure rotatable in A/B axes according to a second embodiment of the present disclosure.

Figure 2:
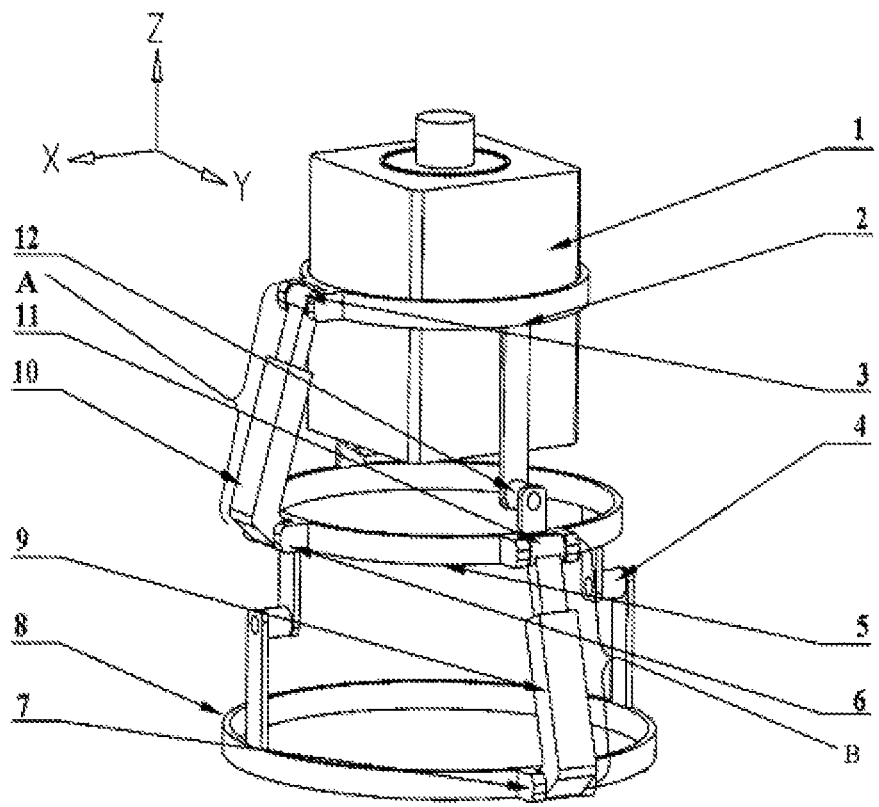
FIG. 2 is a schematic view of a spindle head structure rotatable in A/B axes according to a second embodiment of the present disclosure.

First Embodiment:

According to a first embodiment of the invention, as shown in FIG. 1, the spindle head structure rotatable in A/B axes may comprises a spindle support 2, an intermediate support 5, a base support 8, an upper telescopic strut A and a lower telescopic strut B. The spindle 1 may be adapted to be fixed onto the spindle support 2. The intermediate support 5 may be connected with the spindle support 2 via two coaxial upper revolute pairs 12 and the upper telescopic strut A. The base support 8 may be connected with the intermediate support 5 via two coaxial lower revolute pairs 4 and the lower telescopic strut B. Alternatively, the coaxial upper revolute pairs have axes substantially perpendicular to and intersect with those of the coaxial lower revolute pairs.

The upper telescopic strut A may comprise an upper telescopic limb 10, a first revolute pair 3 connected between the upper telescopic limb 10 and the spindle support 2, and a second revolute pair 6 connected between the upper telescopic limb 10 and the intermediate support 5. The lower telescopic strut B may comprises a lower telescopic limb 9, a third revolute pair 7 connected between the lower telescopic limb 9 and the base support 8, and a forth revolute pair 11 connected between the lower telescopic limb 9 and the intermediate support 5.

The spindle support 2 may be driven by the upper telescopic strut A to rotate around the upper revolute pairs 12 relative to the intermediate support 5, in which the upper telescopic limb 10 may be an actuating member. And the intermediate support 5 may be driven by the lower telescopic strut B to rotate around the lower revolute pairs 4 relative to the base support 8, in which the lower telescopic limb 9 may be an actuating member, so that the spindle support may be rotatable around X and Y axes relative to the base support.

With the spindle head structure rotatable in A/B axes according to the present disclosure, it is ensured that the spindle support has a completely consistent motion characteristics swinging around the X-axis and the Y-axis thereof respectively. Further, spindle head structure rotatable in A/B axes may have a compact structure.

Second Embodiment

The connection of components of the spindle head structure rotatable in A/B axes according to the second embodiment of the invention may be similar to that of the spindle head structure rotatable in A/B axes according to the first embodiment as described hereinabove, and the detailed description thereof will be omitted hereby for clarity and brevity purpose. In the following, only the difference therebetween may be described in detail.

As shown in FIG. 2, the upper revolute pairs may have axes substantially perpendicular to but do not intersect with those of the coaxial lower revolute pairs, so that the deflect angle of the spindle head may become larger, and the interferences between the rotation in the X and Y axes may be avoided accordingly.

Although explanatory embodiments have been shown and described, it would be appreciated by those skilled in the art that changes, alternatives, and modifications can be made in the embodiments without departing from spirit and principles of the invention. Such changes, alternatives, and modifications all fall into the scope of the claims and their equivalents.

What is claimed is:

1. A spindle head structure of a machining device, the spindle head structure having a spindle that is rotatable in A and B axes directions about substantially perpendicular axes, the spindle head structure comprising:
   a spindle support adapted to be fixed with the spindle;
   an intermediate support connected with the spindle support via two coaxial upper revolute pairs that have a common rotation axis;
   a base support connected with the intermediate support via two coaxial lower revolute pairs that have a common rotation axis;
   an upper telescopic strut connected between the spindle support and the intermediate support; and
   a lower telescopic strut connected between the intermediate support and the base support.

2. The spindle head structure according to claim 1, wherein the upper telescopic strut comprises:
   an upper telescopic limb;
   a first revolute pair connected between the upper telescopic limb and the spindle support; and
   a second revolute pair connected between the upper telescopic limb and the intermediate support; and
   the lower telescopic strut comprises:
   a lower telescopic limb;
   a third revolute pair connected between the lower telescopic limb and the base support; and
   a forth revolute pair connected between the lower telescopic limb and the intermediate support.

3. The spindle head structure according to claim 1, wherein the common rotation axis of the upper revolute pairs is substantially perpendicular to the common rotation axis of the coaxial lower revolute pairs.

4. The spindle head structure according to claim 1, wherein the intermediate support is driven by the lower telescopic strut to rotate around the lower revolute pairs relative to the base support, and the spindle support is driven by the upper telescopic strut to rotate around the upper revolute pairs relative to the intermediate support, so that the spindle support is rotatable around X and Y axes of a coordinate system relative to the base support.

* * * * *